US008737736B2

(12) United States Patent
Liu et al.

(10) Patent No.: US 8,737,736 B2
(45) Date of Patent: May 27, 2014

(54) TONE MAPPING OF VERY LARGE AERIAL IMAGE MOSAIC

(75) Inventors: Yuxiang Liu, Superior, CO (US); Wolfgang Schickler, Broomfield, CO (US); Leon Rosenshein, Louisville, CO (US); David Simons, Louisville, CO (US); Ido Omer, Seattle, WA (US); Rob Ledner, Boulder, CO (US)

(73) Assignee: Microsoft Corporation, Redmond, WA (US)

( * ) Notice: Subject to any disclaimer, the term of this patent is extended or adjusted under 35 U.S.C. 154(b) by 348 days.

(21) Appl. No.: 12/983,131

(22) Filed: Dec. 31, 2010

(65) Prior Publication Data

US 2012/0170842 A1 Jul. 5, 2012

(51) Int. Cl.
*G06K 9/00* (2006.01)
(52) U.S. Cl.
USPC .......................................................... 382/169
(58) Field of Classification Search
None
See application file for complete search history.

(56) References Cited

U.S. PATENT DOCUMENTS

| | | | | |
|---|---|---|---|---|
| 5,247,366 A * | 9/1993 | Ginosar et al. | ................ | 348/256 |
| 5,526,501 A * | 6/1996 | Shams | ........................... | 711/217 |
| 5,999,658 A * | 12/1999 | Shimazu et al. | .............. | 382/266 |
| 6,285,798 B1 * | 9/2001 | Lee | ................ | 382/260 |
| 6,826,310 B2 * | 11/2004 | Trifonov et al. | .............. | 382/274 |
| 7,295,232 B2 | 11/2007 | Washisu | | |
| 7,319,787 B2 * | 1/2008 | Trifonov et al. | .............. | 382/168 |
| 8,014,027 B1 * | 9/2011 | Kulkarni et al. | ................ | 358/1.9 |
| 8,237,730 B1 * | 8/2012 | Anderson et al. | ............. | 345/589 |
| 8,279,119 B2 | 10/2012 | Elwell, Jr. et al. | | |
| 8,339,475 B2 * | 12/2012 | Atanassov et al. | ......... | 348/229.1 |
| 2003/0053690 A1 * | 3/2003 | Trifonov et al. | .............. | 382/168 |
| 2003/0185457 A1 * | 10/2003 | Campbell | ...................... | 382/254 |
| 2003/0235342 A1 * | 12/2003 | Gindele | ........................ | 382/260 |
| 2004/0057632 A1 * | 3/2004 | Gindele | ........................ | 382/274 |
| 2005/0100242 A1 * | 5/2005 | Trifonov et al. | .............. | 382/274 |
| 2005/0104900 A1 * | 5/2005 | Toyama et al. | ............... | 345/629 |

(Continued)

FOREIGN PATENT DOCUMENTS

| | | |
|---|---|---|
| EP | 1507234 A1 | 2/2005 |
| EP | 1615169 A2 | 1/2006 |

OTHER PUBLICATIONS

Ashikhmin, Michael, "A Tone Mapping Algorithm for High Contrast Images", Retrieved at<< http://citeseerx.ist.psu.edu/viewdoc/download?doi=10.1.1.18.7977&rep=rep1&type=pdf >>, Eurographics Workshop on Rendering, 2002, pp. 11.

(Continued)

*Primary Examiner* — Bhavesh Mehta
*Assistant Examiner* — Feng Niu
(74) *Attorney, Agent, or Firm* — Steven Spellman; Jim Ross; Micky Minhas

(57) ABSTRACT

A method for tone mapping a high dynamic range image of a large terrestrial area into a lower dynamic range image uses a globally aware, locally adaptive approach whereby local tonal balancing parameter values are derived from known tone mapping parameters for a local 3×3 matrix of image tiles and used in turn to derive a local sigmoid transfer function for pixels in the tile in the middle of the matrix. A global sigmoid transfer function is derived based on values of the tone mapping parameters applicable to the entire image. A lower dynamic range image pixel will have a local tone mapped value and a globally tone mapped value, which are combined by giving each a weighted value to provide a final low dynamitic range pixel value.

23 Claims, 8 Drawing Sheets

(56) References Cited

U.S. PATENT DOCUMENTS

| | | |
|---|---|---|
| 2005/0270299 A1 | 12/2005 | Rasmussen et al. |
| 2007/0014470 A1* | 1/2007 | Sloan .................. 382/162 |
| 2007/0252834 A1 | 11/2007 | Fay |
| 2008/0252882 A1* | 10/2008 | Kesterson ............. 356/300 |
| 2009/0022421 A1 | 1/2009 | Uyttendaele et al. |
| 2009/0041376 A1* | 2/2009 | Carletta et al. ........ 382/274 |
| 2009/0232401 A1* | 9/2009 | Yamashita et al. ..... 382/199 |
| 2009/0263037 A1 | 10/2009 | Qiu et al. |
| 2009/0295937 A1* | 12/2009 | Sato et al. ............. 348/222.1 |
| 2010/0157078 A1* | 6/2010 | Atanassov et al. ..... 348/222.1 |
| 2010/0177203 A1* | 7/2010 | Lin ....................... 348/222.1 |
| 2010/0195901 A1* | 8/2010 | Andrus et al. .......... 382/162 |
| 2010/0226547 A1 | 9/2010 | Criminisi et al. |
| 2010/0329554 A1* | 12/2010 | Zhai et al. ............. 382/167 |

OTHER PUBLICATIONS

Qiu, et al., "Hierarchical Tone Mapping for High Dynamic Range Image Visualization", Retrieved at << http://citeseerx.ist.psu.edu/viewdoc/download?doi=10.1.1.64.4414&rep=rep1&type=pdf >>, 2005, pp. 9.

Kopf, et al., "Capturing and Viewing Gigapixel Images", Retrieved at << http://johanneskopf.de/publications/gigapixel/paper/FinalPaper_0371.pdf >>, 2007, pp. 10.

\* cited by examiner

TONE MAPPING OF VERY LARGE AERIAL IMAGE MOSAIC

BACKGROUND

Mapping and imaging large terrestrial areas present many challenges. One technical issue presented by color images of terrestrial areas relates to color reproduction of raw images. For example, the atmosphere has an undesired distance-dependent influence that can cause a digital image to appear blue and/or hazy. Or, for another example, the sun has an angle-dependent influence that can cause parts of a digital image of a lame terrestrial area to appear brighter than other parts, even though the brightness of the scene itself is relatively uniform. Techniques have been developed, for dealing with these and other issues surrounding the accurate capture of such images in digital form. In particular, techniques have been developed to handle the challenges of accurately capturing scene content in spite of lame, often non-linear, variations across the image.

Thus, the content of an image of a lame terrestrial area can be accurately captured using a high dynamic range, large format camera, such as a Microsoft UltraCam aerial camera. However, the dynamic range of the captured image is typically higher than that of a visual display device such as a computer monitor or a printer on which the image is to be viewed or reproduced. For example, such cameras might capture the image in a format with a 16-bit dynamic range, while a computer monitor or printer might only have an 8-bit dynamic range. Likewise, it would usually be more practical to store and retrieve such image data in a form with the same dynamic range as the visual display device with which it is to be viewed, rather than the larger dynamic range of the image produced by the camera. This is because the reduced dynamic range image will use less storage space and will not require conversion in order to reproduce the data in a visible form. And if the images are stored on a remote location and accessed through the Internet, reducing image's dynamic range will also reduce the bandwidth and time required to download images stored in the cloud to a local computer for display.

On the other hand, it is necessary that the content of the original 16-bit image be preserved, to the greatest extent possible when converting it to an 8-bit image. Otherwise, content of the image will be lost to those who want to view it on a computer monitor, print it, or otherwise make it visible on a visual display device.

SUMMARY

One aspect of the subject matter discussed herein provides a manner of converting an original digital image with pixels having a particular dynamic range into a corresponding image with pixels having a lower dynamic range by a tone mapping technique that reduces loss of content in the original image and minimizes artifacts in the corresponding image.

In one aspect of the subject matter claimed herein, a method for tone mapping a high dynamic range image of a large terrestrial area into a lower dynamic range image uses a globally aware, locally adaptive approach whereby local tonal balancing parameters are derived from known tone mapping parameters for a local matrix of image tiles and used in turn to derive a local sigmoid transfer function. A global sigmoid transfer function is derived based on values of the tone mapping parameters applicable to the entire image. Pixels are tone mapped using a local tone mapped value and a global tone mapped value, which are combined using a weighting factor applicable to each value.

In another aspect of the subject matter claimed herein, a computer system includes a tone mapping program module with algorithms embodied in executable instructions for performing a tone mapping method such as that described, a storage module for storing the pixels of the tone mapped image, and a display component for displaying the tone mapped image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The objects of the subject matter discussed herein will be better understood from the detailed description of embodiments which follows below, when taken in conjunction with the accompanying drawings, in which like numerals and letters refer to like features throughout. The following is a brief identification of the drawing figures used in the accompanying detailed description.

One skilled in the art will readily understand that the drawings are schematic in many respects, but nevertheless will find them sufficient, when taken with the detailed description that follows, to make and use the claimed subject matter.

DETAILED DESCRIPTION

Figure 1:
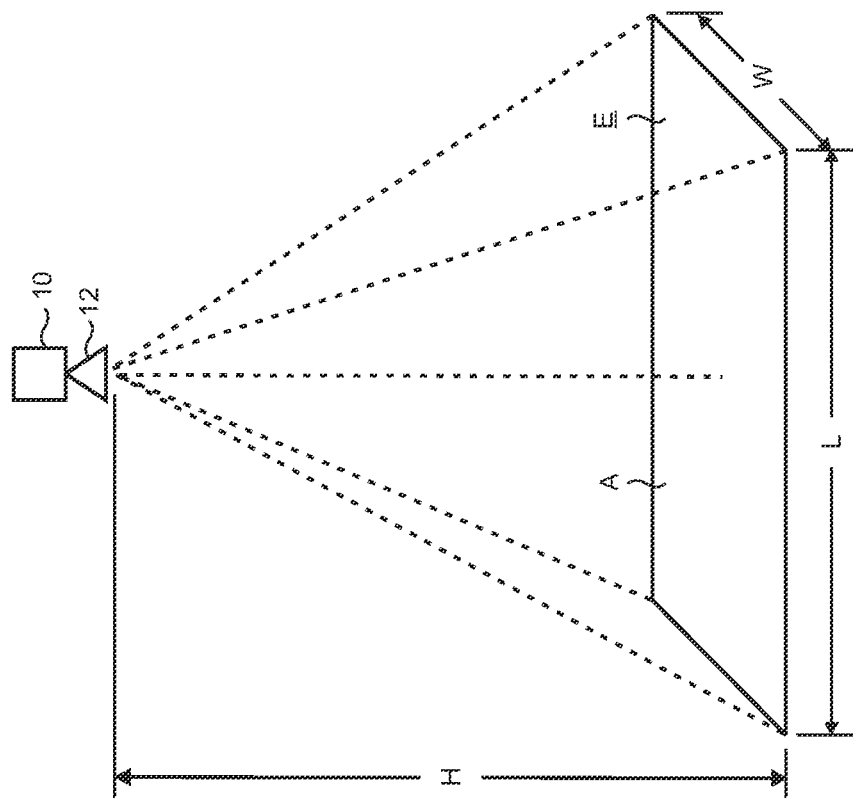
FIG. 1 schematically depicts a terrestrial area A photographed by a high dynamic range, large format digital camera at an altitude H above the earth.

Referring first to FIG. 1, a digital image of a large terrestrial area is generated in a known fashion by a large format, digital aerial camera 10 at an altitude H above the surface of the earth E. The camera 10 includes a lens 12 with a suitable focal length to create a digital image of an area A that is L kilometers long by W kilometers wide. In a typical application, the altitude H is about 6 kilometers, L is about 8.5 kilometers, and W is about 1.5 kilometers. An example of such a camera is an UltraCamX made by Vexcel Imaging GmbH of Graz, Austria, a wholly owned subsidiary of Microsoft Corporation. A detailed description of the UltraCamX camera and how it is utilized to create a mosaic image of a large terrestrial area can be found in Gruber, Michael, et al., "UltraCam$_x$, the Large Format Aerial Digital Camera System by Vexcel Imaging/ Microsoft," *Int'l Archives of the Photogrammetry, Remote Sensing and Spatial Information Sciences*, Vol. XXXVII, Part B1, Beijing 2008, pages 665-670. It should be emphasized that any known manner of capturing images of a region of the earth's surface for mapping purposes according to the description herein can be used, and the UltraCamX described in the Gruber article is given as an example for illustrative purposes only.

Figure 2:
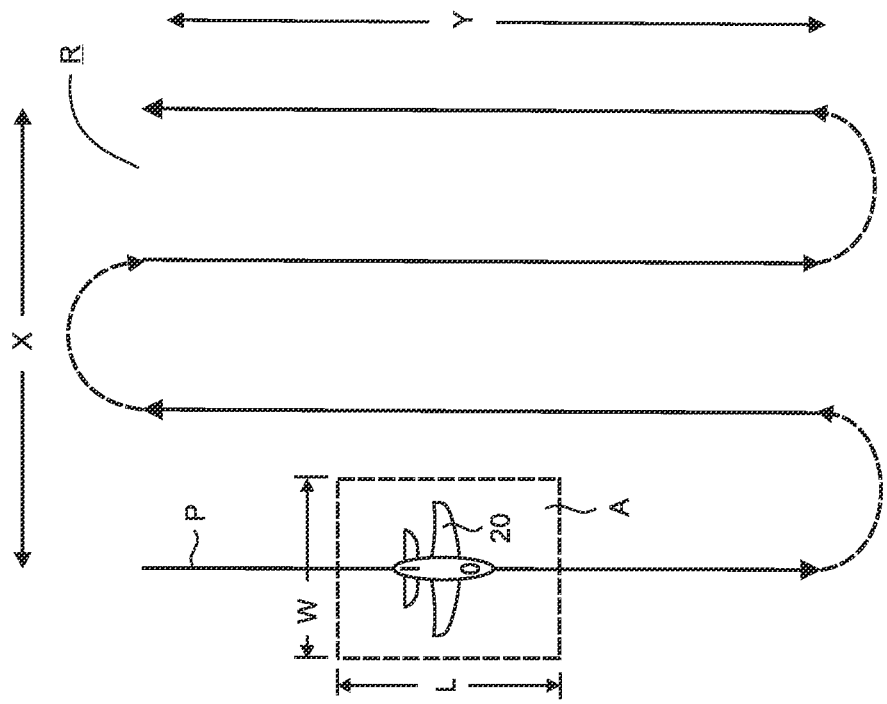
FIG. 2 schematically depicts an aircraft carrying the camera depicted in FIG. 1 on a flight path suitable for creating a image of a large terrestrial region R.

The camera 10 and lens 12 are typically mounted in an aircraft 20 as shown in FIG. 2 that follows a flight path P to capture raw images having a 16-bit dynamic range with the camera 10. That is, each pixel of an image has a value represented by 16 data bits, and such an image is generally regarded as having a high dynamic range. However, it will be understood that the acronym "HDR" is used herein only to denote a dynamic range greater than the lower dynamic range into which the images will be tone mapped according to methods discussed farther below. That is, the tone mapping method described herein is discussed in connection with converting 16-bit pixels into 8-bit pixels, the latter sometimes being referred to by the acronym "LDR" (low dynamic range). Nevertheless, these acronyms are intended only to indicate relative values, with an HDR pixel having a higher dynamic range than an LDR pixel, and do not refer to dynamic ranges with any particular number of bits.

In any event, each raw image produced by the camera 10 is of an area A, and the flight path P is a zig-zag pattern that covers a large region R of the earth's surface. The dimensions of the region R might typically be X=100 kilometers and Y=100 kilometers, although other size regions can be imaged as well. It will be appreciated from FIG. 2 that the flight path and the timing of the image capture results in overlap of each area A with its neighbors both in the L and the W directions. The images thus captured are processed and assembled into an image that represents the region R.

Figure 3:
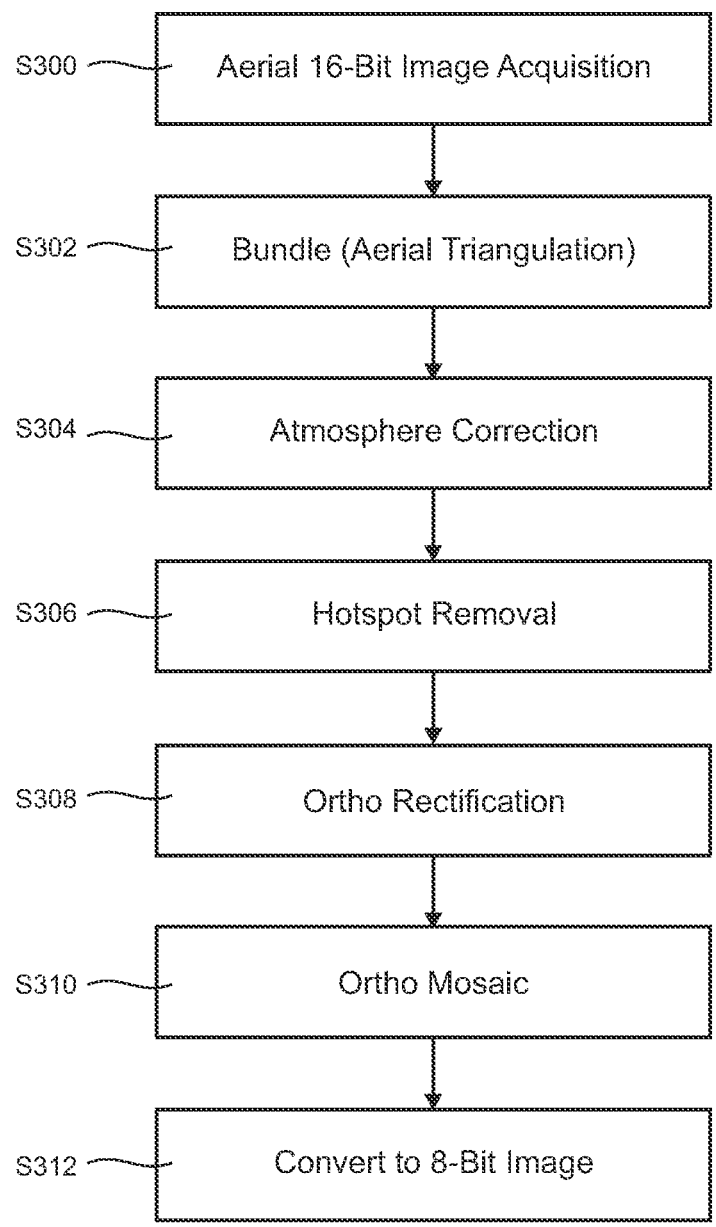
FIG. 3 is a flowchart showing typical steps performed for processing raw photographic images acquired by an airplane-mounted camera traveling the flight path shown in FIG. 2.

FIG. 3 illustrates an example of a method for processing the raw images captured by the camera 10 into an image that accurately represents the region R. Step S300, image capture, has already been described in connection with FIGS. 1 and 2. The images referred to in step S300 are the overlapping images of the region R with a 16-bit dynamic range produced by following the flight path P. It will be understood by those skilled in the art that these images can be the result of more than one set of raw images of the region R. For example, one set of images might be in the range of visible light, while another set might be in the infrared region. The images may also be the result of several flights taken at different times of day.

In step S302 a bundle adjustment is performed according to known principles using a process of aerial triangulation that minimizes the reprojection errors arising because the image represents multiple three-dimensional points photographed from different viewpoints. Next, step S304 is a radiometric process that removes atmospheric scattering (Rayleigh & Mie) in the aerial images. This corrects for the atmosphere's distance-dependent influence and prevents the image from falsely appearing blue and/or hazy. This step can be performed in accordance with the techniques described, in U.S. patent application Ser. No. 12/973,689, discussed above. Step S306 is also a radiometric process that removes hotspots caused by microshadows that result in uneven illumination of the images by correcting for the sun's angle-dependent influence. This can cause parts of the image captured by the camera 10 to appear brighter than other parts, even though the brightness of the scene itself is relatively uniform. A technique for performing this image correction can be based on the principles discussed in Chandelier, L., et al, "A Radiometric Aerial Triangulation for the Equalization of Digital Aerial Images," *Programmetric Engineering & Remote Sensing*, pages 193-200 (2009). In step S308 the atmosphere-corrected images with hotspots removed are ortho rectified. This is a known geometric process that corrects an aerial image so that the scale is uniform, like a map, without distortion. This is followed by step S310, in which the ortho rectified images are assembled using a known segmentation process by which the multiple ortho rectified images are assembled into a seamless mosaic of image tiles. This can be performed by an algorithm using max-flow-min-cut theory known to those skilled in the art.

It will be appreciated that the resulting image data after step S310 still has a 16-bit dynamic range. As discussed above, this dynamic range is generally not suitable for use by visual display devices such as computer monitors or printers, which typically have an 8-bit dynamic range. It is also advantageous to store the resulting image of the region R in an 8-bit dynamic range format, to use less storage space and to facilitate image transfer from one location to another (such as over the Internet). There are many known tone mapping techniques for converting a 16-bit dynamic range image to an 8-bit dynamic range image. It is also known to perform such tone mapping either on the raw images captured by the camera 10 (that is, right after step S300 and before any other image processing), or after step S310, when an ortho mosaic representing the image of region R has been constructed. The advantageous tone mapping methods described herein perform tone mapping after step S310 and are represented generally in FIG. 3 by step S312.

Figure 4:
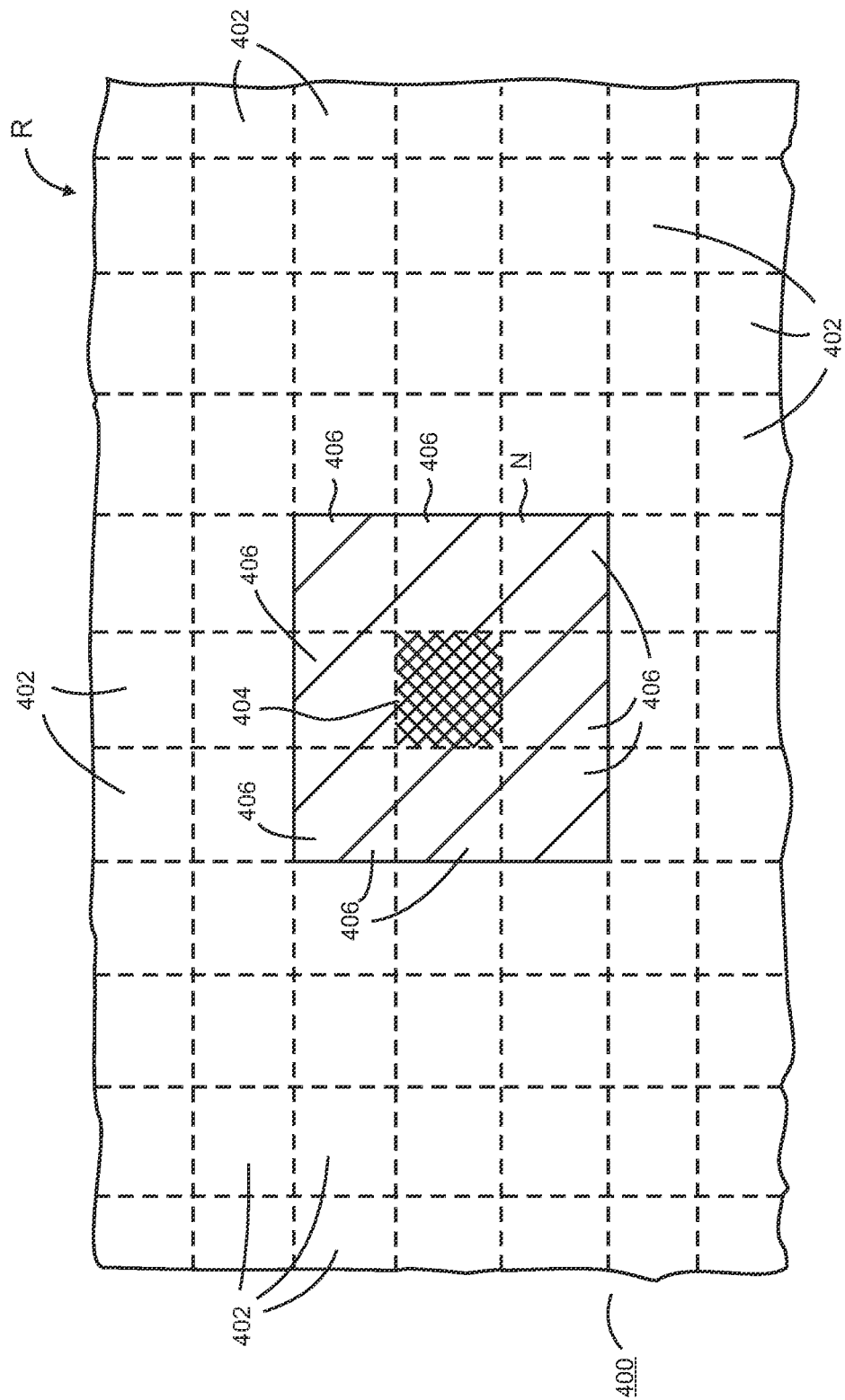
FIG. 4 is a schematic representation of a mosaic of image tiles resulting from processing the raw photographic images in accordance with FIG. 3.

FIG. 4 represents a portion of the image of the 10,000 km$^2$ region R after processing through step S310 in FIG. 3. It has a 16-bit dynamic range, and due to the processing carried out in steps S302 to S310, it very accurately captures the content of the region R photographed by the camera 10. In the 16-bit to 8-bit tone mapping technique discussed herein, the image is represented by a two-dimensional grid 400 of tiles 402. Each tile represents an ortho image of a given rectangular area of the ortho mosaic of the region R constructed in step S310 above. In the present embodiment all of the tiles 402 have the same dimensions, chosen here to be 6250 pixels by 6250 pixels. Other dimensions can be used and the tiles do not all have to have the same dimensions, although the tone mapping methods described herein are simplified if all of the tiles have similar dimensions. A tone mapping method in accordance with the embodiment described herein is applied to each tile 402 in the mosaic grid 400. To illustrate this method, it will be explained in detail for a typical tile 404, indicated by criss-cross hatching in FIG. 4. The method also considers tiles 406 proximate to the central tile 404. These proximate tiles, which in the present embodiment comprise a 3×3 matrix, are sometimes referred to herein as a local neighborhood N that includes the tile 404. Although tone mapping has previously been applied on a tile-by-tile basis, tone mapping according to the methods to be described now is uniquely globally aware and locally adaptive. Various advantages of such methods are discussed further below.

Figure 5:
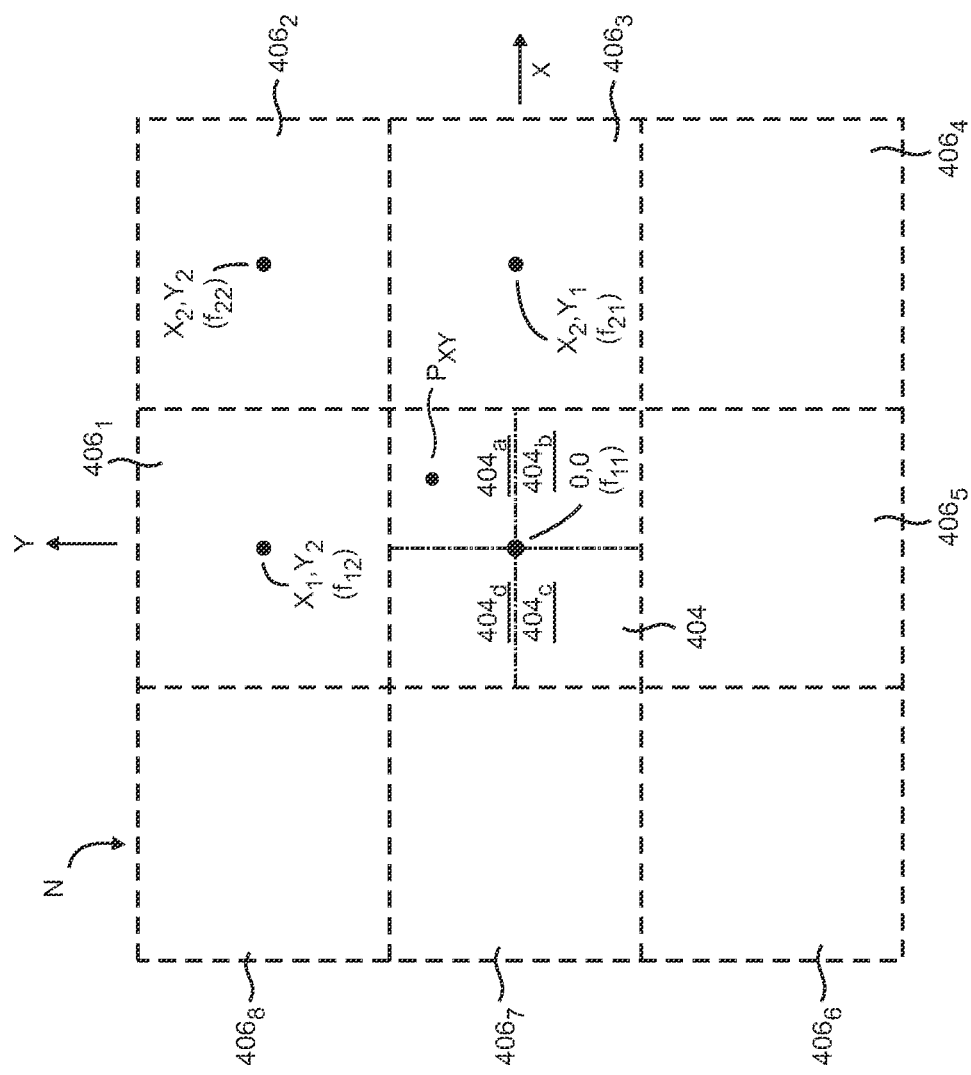
FIG. 5 shows one of the tiles in FIG. 4 at the center of a 3×3 matrix for illustrating an embodiment of the tone mapping method discussed in the flowing section.

FIG. 5 is a detailed view of the typical 3×3 tile neighborhood N in FIG. 4. It will be appreciated that the dimensions of the tile neighborhood used in the tone mapping method described herein is not limited, to a 3×3 matrix, and the neighborhood can be other dimensions if it is determined that better tone mapping results will be obtained. The size of the neighborhood is chosen depending on the scene content. Given a certain tile size, a neighborhood of N×N tiles should represent an area of the image the content of which varies sufficiently that its histogram converges to a Gaussian shape. Each tile, including the tile 404 under discussion, has certain properties that are conventionally used in tone mapping applications. The technique described here uses the known tone mapping parameters shadow percentile and highlight percentile, sometimes referred to by those skilled in the art as "max-min stretch." These parameters are determined "locally," that is, by using the parameters for the proximate tiles such as those in the neighborhood N, and "globally," meaning that the average values of the parameters for all of the tiles in the region R are taken into account.

Figure 6:
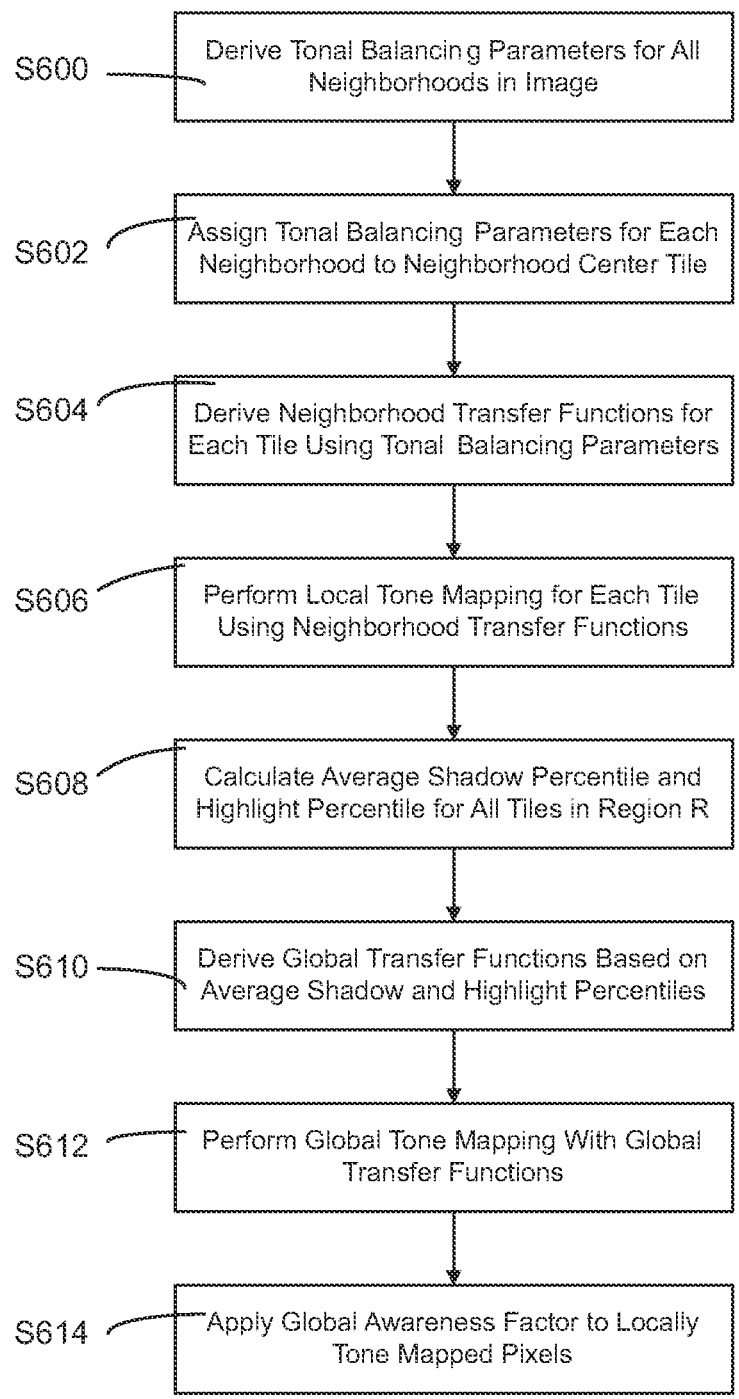
FIG. 6 is a flowchart illustrating the embodiment of the tone mapping method discussed herein by which the 16-bit pixel image produced by the image processing method shown in FIG. 3 is converted to an 8-bit pixel image.
Figure 7:
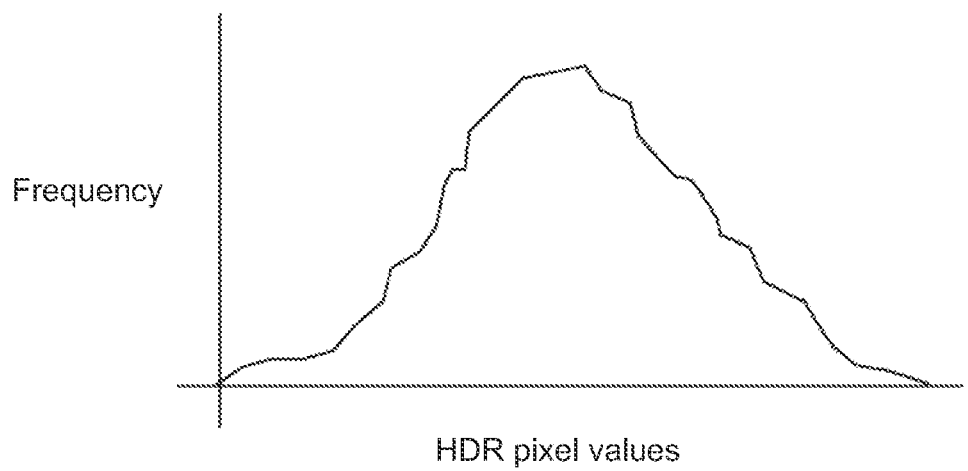
FIG. 7 is an example of a representative histogram for a portion of a dynamic range (HDR) pixel image such as that shown in FIG. 5.

FIG. 6 is a flowchart that illustrates the tone mapping method now described in more detail, and referred to as step S312 in FIG. 3. In the flowchart in FIG. 6, the first step S600 derives the values of tonal balancing parameters for each neighborhood N in the region R. (See FIGS. 2 and 4.) This is done using shadow percentile values and highlight percentile values derived from the histogram for the neighborhood N of a given tile. It is possible to derive the histogram for any particular neighborhood by using the values for the individual tiles included in the neighborhood, which values are in the present embodiment, already available because the tiles in FIG. 4 are preferably the same tiles used to assemble the image as described above in connection with FIG. 3. That is, the values of these parameters are known because they were already derived in connection with the image processing discussed above in connection with FIG. 3. However, it is within the scope of the subject matter described and claimed herein to derive a histogram for each neighborhood in any known fashion using information about the image from the processing described above in connection with FIG. 3. The tonal balancing parameters are then derived from shadow percentile and highlight percentile values determined in a known fashion using a histogram for all the tiles in each of the neighborhoods N. FIG. 7 is an illustrative example of a histogram for a typical neighborhood N of HDR pixels, and indicates the frequency distribution for the entire neighborhood for a particular image component (red, green, blue, or infrared).

The present embodiment derives the following four tonal balancing parameter tile values for each neighborhood from the image's red (R), green (G), blue (B), and infrared (IR) components:

RGBTileShadowValue=min(ShadowValueR,ShadowValueG,ShadowValueB)
FCIRTileShadowValue=min(ShadowValueR,ShadowValueG,ShadowValueIR)
RGBTileHighlightValue=max(HighlightValueR,HighlightValueG, HighlightValueB)
FCIRTileHighlightValue=max(HighlightValueR,HighlightValueG, HighlightValueIR)

The notation "min(A,B,C)" indicates that the tonal balancing parameter is taken as the minimum value of the included percentile values for all of the image pixels in the neighborhood of a given tile, say tile 404 in the neighborhood N. For example, RGBTileShadowValue represents the lowest value of ShadowValueR (meaning the shadow percentile value for the red image component), ShadowValueG, or ShadowValueB for all of the pixels in the neighborhood of the given tile. Stated another way, if for a neighborhood centered at the given tile the value of ShadowValueR<both the value of the ShadowValueG and the value of ShadowValueB, then RGBTileShadowValue=ShadowValueR. Similarly, the notation "max(A,B,C)" indicates that the tonal balancing parameter is taken as the maximum value of the included percentile values for all of the image pixels in the neighborhood centered at the given tile (the tile 404 in the present example).

In step S602 each neighborhood's tone mapping parameters are assigned to the center tile of each neighborhood. In step S604 neighborhood sigmoid transfer functions are derived for each tile using the above tonal balancing parameters. First, dynamic ranges are determined for each image component of each tile based on the tonal balancing parameters derived step S602. In the present embodiment the 16-bit dynamic range for each of the R, G, and B components of the tile is set to RGBTileHighlightValue−RGBTileShadowValue and the 16-bit dynamic range for the IR component of the tile is set to FCIRTileHighlightValue−FCIRTileShadowValue. For ease of notation in the discussion that follows below, the 16-bit value for the R, B, and G components of the tile will be used as an example, but the same principles are applied to both the R,G,B components and the IR components of a tile. This value is used as the tile dynamic range for the sigmoid transfer function assigned to a tile as discussed in the next paragraph.

Figure 8:
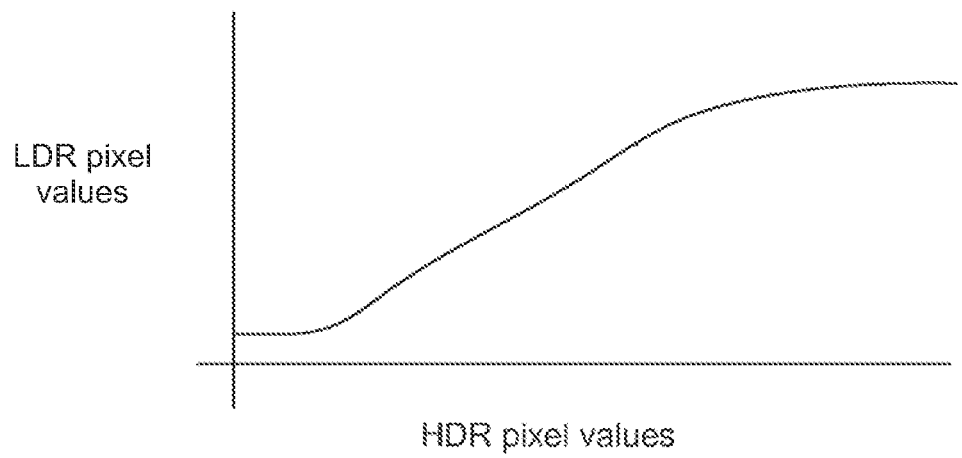
FIG. 8 is an example of a sigmoid transfer function for tone mapping high dynamic range (HDR) pixels to corresponding lower dynamic range (LDR) pixel.

The local tone mapping involves mapping the 16-bit value for each image component to an 8-bit value from 0 to 255 ($2^8$=256) using a neighborhood sigmoid transfer function for each image component. A typical sigmoid transfer function is depicted in graph form in FIG. 8. Each image component (R,G,B,IR) represented by an HDR (here, 16-bit) pixel, as plotted along the abscissa in FIG. 8, has a corresponding LDR (here, 8-bit) image component plotted along the ordinate. In step S604 tile transfer functions are derived for mapping each 16-bit pixel component value in the tile 404 to an 8-bit pixel component value. A given 16-bit pixel component value being mapped to an 8-bit value first has an offset of RGBTileShadowValue for the tile containing the pixel subtracted from the pixel value. For the tile 404, the value of this parameter for the neighborhood N is used, which has been assigned to tile 404 in step S602. Next, the pixel component value is multiplied by a scale factor=1÷the derived 16-bit dynamic range for the tile (as discussed above) containing the pixel to obtain a floating point value between 0 and 1, and a gamma correction function with a gamma value (γ) specific to the camera 10 used to photograph the region R is applied to this floating point value. The known gamma correction function is a power-law function in the form $y=x^{1/\gamma}$, where x is the input floating point value and the y is the output. A typical value for gamma is 2.2. Finally, the gamma-corrected floating point value y is multiplied by 255 to determine the sigmoid transfer function for mapping the 16-bit value for each image component of the pixel to an 8-bit value. Any resulting value below RGBTileShadowValue will be mapped to 0, and any resulting value above RGBTileHighlightValue will be mapped to 255. In practice, the resulting sigmoid transfer function is embodied in a look-up table to which a computer processor can refer on a tile-by-tile basis.

In step S606 local tone mapping for each tile is performed by first tonally blending each pixel in every tile 402 in the region R. Again, taking the tile 404 shown in FIG. 5 as representative, it first is considered as being divided into four quadrants 404a, 404b, 404c and 404d. As mentioned above, the local tonal balancing parameters RGBTileShadowValue, FCIRTileShadowValue, RGBTileHighlightValue, and FCIRTileHighlightValue for the neighborhood N centered at tile 404 are assigned to that tile. These parameters are used to derive the neighborhood tonal balancing sigmoid transfer function ($f_{11}$) as described above. After the sigmoid transfer function is obtained it is assigned to tile 404. The influence area of this sigmoid transfer function includes all the pixels in the tile 404 itself and the other eight tiles that surround the tile 404 (e.g., tiles 406$_{1-8}$ in FIG. 5). The neighborhood sigmoid transfer functions of each of the other eight tiles are derived using each of their own assigned neighborhood tonal balancing parameters derived as discussed above in connection with the tile 404. The sigmoid transfer functions of tiles 406$_1$, 406$_2$, 406$_3$ in FIG. 5 are denoted here as $f_{12}$, $f_{22}$, and $f_{21}$, respectively, for ease of describing the local tonal blending algorithm for the pixels in the top-right quadrant (404a) of tile 404.

For this quadrant, the center pixel location of the tile 404 is selected as the origin of an orthogonal X-Y coordinate axis system, as shown in FIG. 5. For ease of reference, the reference $P_{X,Y}$ is used here to denote the respective blended values for any pixel in the quadrant 404a after local tone mapping of each pixel component (R,G,B,IR) of the pixel at coordinates X,Y using the applicable transfer functions for the tile 404, 406$_1$, 406$_2$, and 406$_3$ derived in step S604. To apply each transfer function, the actual HDR (here, 16-bit) source pixel value ($S_{X,Y}$) in the ortho image resulting from step S310 at the location (X,Y) is read from the source image first, then the pixel value is transformed (four times) with the four transfer functions to four LDR (here, 8-bit) values. The notations $f_{11}(S_{X,Y})$, $f_{12}(S_{X,Y})$, $f_{21}(S_{X,Y})$, and $f_{22}(S_{X,Y})$ in the local tonal blending algorithm described below denote the respective LDP values obtained from the four transfer functions applied on the source pixel (HDR) value $S_{X,Y}$. Considering that notation, the respective locally blended value for a destination pixel $P_{X,Y}$ in the first quadrant 404a is calculated by the following tonal blending bilinear interpolation algorithm:

$$R1 = (X2-X)/(X2-X1) \times f_{11}(S_{X,Y}) + (X-X1)/(X2-X1) \times f_{21}(S_{X,Y}) \quad (1)$$

$$R2 = (X2-X)/(X2-X1) \times f_{12}(S_{X,Y}) + (X-X1)/(X2-X1) \times f_{22}(S_{X,Y}) \quad (2)$$

$$P_{X,Y} = (Y2-Y)/(Y2-Y1) \times R1 + (Y-Y1)/(Y2-Y1) \times R2 \quad (3)$$

where:
X,Y are the coordinates of the pixel in question; X1,Y2 are the coordinates of the center of the tile 406$_1$; X2,Y1 are the coordinates of the center of the 406$_3$;
and X2,Y2 are the coordinates of the center of the tile 406$_2$. The respective transfer functions $f_{11}$, $f_{12}$, $f_{21}$, and $f_{22}$ for each tile are indicated in FIG. 5, also.

This provides all of the blended, tone mapped pixel values (for all image components R,G,B,IR) for the pixel at the point with the coordinates X,Y, using the bilinear interpolation algorithm, with the four tone mapped pixel values obtained with the respective sigmoid transfer functions for each pixel component.

The same local blended tone mapping is performed for each pixel in each of the other quadrants 404b, 404c, and 404d. More specifically, for the quadrant 404b, the above tonal blending bilinear interpolation algorithm is applied using the transfer functions assigned to the tiles 404, 406$_3$, 406$_4$, and 406$_5$; for the quadrant 404c, the tonal blending algorithm is applied using the transfer functions assigned to the tiles 404, 406$_5$, 406$_6$ and 406$_7$; for the quadrant 404d, the tonal blending algorithm is applied using the transfer functions assigned to the tiles 404, 406$_7$, 406$_8$, and 406$_1$. At the edges of the region R, the tonal blending is performed using the adjacent tiles that are available. For example, if the tile 404 were at the upper periphery of the region R, then the values assigned to the transfer functions $f_{12}$ and $f_{22}$ in equation (2) above would be set to zero. Accordingly, equation (3) would become:

$$P_{XY} = (Y2-Y)/(Y2-Y1) \times R1$$

Likewise, if the tile 404 were at the lower periphery of the region R, tonal blending for the quadrant 404b would be carried out using only adjacent tile 406$_3$.

The embodiment as described thus far contemplates a parallel processing approach whereby all of the tonal balancing parameters are derived for all of the neighborhoods before the local tone mapping step S606. It will be appreciated that local tone mapping can be carried out on a more or less serial type processing on a neighborhood-by-neighborhood basis, or some combination of parallel processing of some neighborhoods of the region R and serial processing of neighborhoods already processed.

The next step S608 involves determining the average value of the shadow percentiles and highlight percentiles for all of the tiles in the region R, using the values for these parameters as derived above for each center tile of all of the neighborhoods. The average value of these image parameters can be determined by summing the thus-derived values for each tile in the image of region R on a tile-by-tile basis and dividing by the total number of tiles. In step S610 global sigmoid transfer functions for each image component (R,G,B,IR) are derived as discussed above, but using the average global values. In step S612 an 8-bit pixel is mapped from each 16-bit image pixel in the entire image using the global transfer functions.

More specifically, the present embodiment derives global transfer functions from tonal balancing parameters based on the global averages of the shadow percentile values and highlight percentile values for each of the 16-bit HDR image's red (R), green (G), blue (B), and infrared (IR) components:
RGBGlobShadowValue=min(ShadowValueR,ShadowValueG,ShadowValueB)
FCIRGlobShadowValue=min(ShadowValueR,ShadowValueG,ShadowValueIR)
RGBGlobHighlightValue=max(HighlightValueR,HighlightValueG, HighlightValueB)
FCIRGlobHighlightValue=max(HighlightValueR,HighlightValueG, HighlightValueIR)

The global transfer functions for each image component are derived from these global tonal balancing parameters as discussed above in connection with the neighborhood transfer functions, with the global values defined above substituted for the neighborhood values in the discussion above. In the present embodiment the global 16-bit dynamic range for each of the R, G, and B components of the tile is set to RGBGlobHighlightValue−RGBGlobShadowValue and the global 16-bit dynamic range for the IR component of the tile is set to FCIRGlobHighlightValue−FCIRGlobShadowValue. As before, the 16-bit value for the R, B, and G components of the tile will be used as an example in the discussion below, but the same principles are applied to both the global R,G,B components and the global IR components.

The global tone mapping involves mapping the 16-bit value for each pixel's image component to an 8-bit value from 0 to 255 ($2^8$=256) using a global sigmoid transfer function for each image component. A given 16-bit pixel component value being mapped to an 8-bit value first has an offset of RGBGlobShadowValue for the tile containing the pixel subtracted from the pixel value. Next, the pixel component value is multiplied, by a scale factor=1÷the derived 16-bit global dynamic range for the tile containing the pixel to obtain a floating point value between 0 and 1, and the same gamma correction function as before is applied to this floating point value. Finally, the gamma-corrected global floating point value is multiplied by 255 to determine the global sigmoid transfer function for mapping the 16-bit value for each image component of the pixel to an 8-bit value. Any resulting value below RGBGlobShadowValue will be mapped to 0, and any resulting value above RGBGlobHighlightValue will be mapped to 255. In practice, the resulting global sigmoid transfer function is embodied in a look-up table to which a computer processor can refer.

Step S614 applies a global awareness factor to the locally tone mapped pixels obtained in step S606. As noted, each pixel comprises local 8-bit image components or channels (R,G,B,IR) resulting from step S606 and corresponding 8-bit global image components resulting from step S612. Step S614 combines each local image component and its corresponding global image component using a sum-to-1 weighting factor. Taking as an example the red component or channel of a given pixel, the final value R_final of the 8-bit tone mapped pixel is given by the following algorithm:

$$R\_final = R\_local\ weight + R\_global \times (1 - local\ weight) \quad (4)$$

where:

R_local is the pixel's 8-bit red component resulting from step S606; R_global is the pixel's 8-bit red component resulting from step S612; and "local weight" is a weighting factor applied to have the tone mapping result be more locally weighted. A value for local weight that has been found to be advantageous is 0.20, The parameter (1−local weight) is a "global awareness factor" having a sum-to-1 relationship ((1−local weight)+local weight=1) with the "local adaptive factor" local weight. The final values of the other image components (R,G,B,IR) are determined in the same fashion. That is, each component of each pixel has a local 8-bit component and a global 8-bit component. The final value for the tone mapped 8-bit pixel is determined in accordance with equation (4).

The above described globally aware, locally adaptive tone mapping process improves the image quality of the tone mapped image, especially of those image portions that are particularly homogeneous and thus exhibit a narrow histogram, like expanses of water. When the histograms of such areas are too narrow (that is, have a standard deviation much smaller than a typical histogram of a more varied image portion). The image parameters shadow percentile and highlight percentile of such homogeneous image portions will also have Barrow ranges of values, and will likely not reflect the true luminance range of those image portions. If only the narrow-range image parameters are used for tone mapping, the resultant image can be too light or too dark compared with other more varied image tiles. The present tone mapping method avoids these shortcomings by virtue of considering local and global statistics simultaneously, thereby enhancing uniformity from global parameters and contrast from local parameters.

Figure 9:
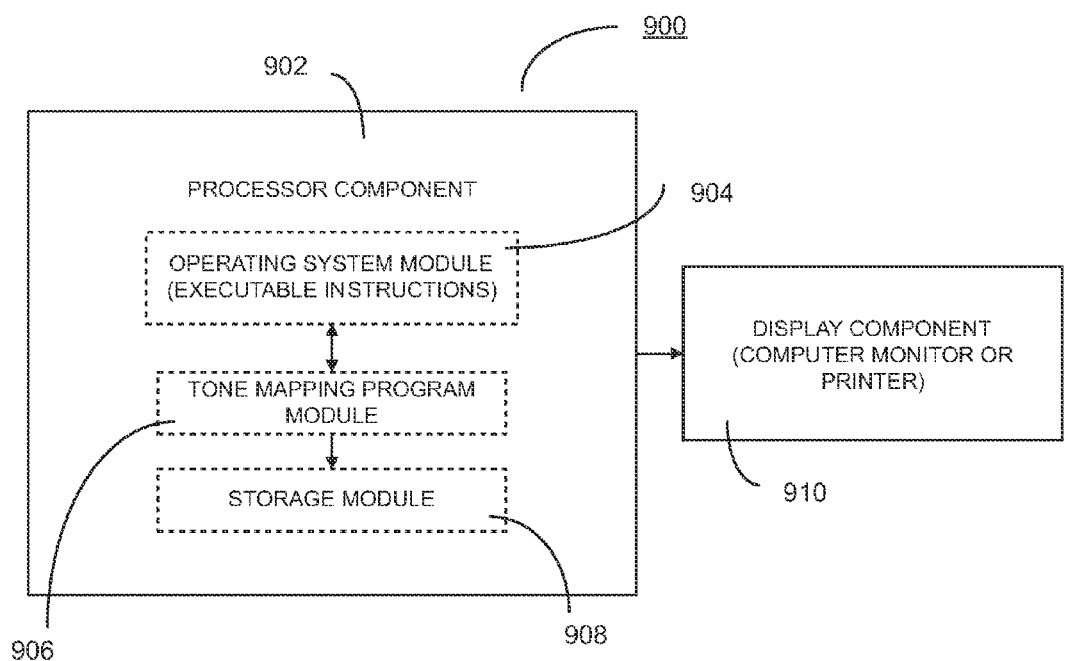
FIG. 9 is a schematic depiction of a computer system for performing a tone mapping method in accordance with the principles discussed herein.

It will be appreciated that the above tone mapping method is particularly adapted to be performed by a conventional digital computer system 900 such as that shown schematically in FIG. 9, comprising apparatus with a processor component 902 having an operating system module 904 for controlling the operation of system components such as atone mapping program module 906 and a storage module 908. The operating system module is typically stored on a non-transitory computer storage medium or device such as a hard drive (not shown), and is embodied in computer executable instructions that are executed by the processor component 102. It is within the ability of one skilled in computer programming to write executable instructions for inclusion in the tone mapping program module 906 that can implement the algorithms described above. The tone mapped pixels resulting from application of such algorithms will typically be stored in a storage module 908 for ultimate communication to a display component such as a computer monitor or printer for rendering the tone mopped image in human-readable form.

It will also be appreciated that tone mapped images in accordance with the methods described above can be generated using a processor module similar to that depicted in FIG. 9 and stored at one or more remote sites in the cloud, for access through conventional techniques, such a as Web browser on a client computer system. As noted above, the storage of the image in an LDR form will facilitate the transfer of the image from one location to another over wireless or wired connections because the number of data bits represented by the image is less than if the image were stored and transmitted in its original HDR form.

As used in this description, the terms "component," "module," "system," "apparatus," "interface," or the like are generally intended to refer to a computer-related entity, either hardware, a combination of hardware and software, software, or software in execution, unless the context clearly indicates otherwise (such as the use of the term "image component"). For example, such a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. It will be further understood that a "module," as used herein, and particularly in FIG. 9, is not necessarily, and typically is not, a physically separate component. The modules referred to in connection with FIG. 9 are to be understood in a broad sense as information in the form of executable instructions, storage locations, etc., that may be, and typically are, distributed across various locations in the storage media on which they reside.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disc, floppy disc, magnetic strips . . . ), optical discs (e.g., compact disc (CD), digital versatile disc (DVD) . . . ), smart cards, and flash memory devices (e.g., card, stick, key drive . . . ). Of course, those skilled in the art will recognize many modifications may be made to this configuration without departing from the scope or spirit of the claimed subject matter. Moreover, the term "computer" is not meant to be limiting in any manner. For example, the claimed subject matter can be embodied in any suitable apparatus, including desktop computers, laptops computers, personal digital assistants, smart phones, televisions, and the like.

From this description, it will be appreciated that in a general sense, the disclosed subject matter relates to a method for converting a first image represented by HDR pixels having a predetermined dynamic range, said first image comprising a plurality of tiles each including a two-dimensional array of a plurality of said pixels, into a second image with corresponding LDR pixels having a lower dynamic range. The method performs a local tone mapping on each HDR pixel of the first image using a local transfer function for converting the HDR pixel to an LDR pixel having a locally tone mapped value. In addition, a global tone mapping is performed on each HDR pixel using a global transfer function for converting the HDR pixel to an LDR pixel having a globally tone mapped value, with the global transfer function being derived from an average value of the image parameter of all of the HDR pixels. A final value for each LDR pixel is derived by weighting the locally and globally tone mapped pixel values using a first weighting factor applied to each locally tone mapped LDR pixel value and a second weighting factor applied to each globally tone mapped LDR pixel value and combining the weighted locally and globally tone mapped LDR pixel values. The final LDR pixel values are stored in a storage device for outputting the second image.

Unless specifically stated, the methods described herein are not constrained to a particular order or sequence. In addition, some of the described method steps can occur or be performed concurrently. Further, the word "example" is used herein simply to describe one manner of implementation. Such an implementation is not to be construed as the only manner of implementing any particular feature of the subject matter discussed herein. Also, functions described herein as being performed by computer programs are not limited to implementation by any specific embodiments of such programs.

Although the subject matter herein has been described in language specific to structural features and/or methodological acts, it is to be understood that the subject matter of the appended claims is not limited to the specific features or acts described above. Rather, such features and acts are disclosed as sample forms of corresponding subject matter covered by the appended claims.

What is claimed is:

1. A method for converting a first image represented by HDR pixels having a predetermined dynamic range, said first image comprising a plurality of tiles each including a two-dimensional array of a plurality of said HDR pixels, into a second image with corresponding LDR pixels having a lower dynamic range, the method including:
    performing a local tone mapping on each HDR pixel of said first image using a local transfer function for converting HDR pixels into LDR pixels having a locally tone mapped value, said local transfer function being derived from at least one image parameter of said HDR pixels in a plurality of tiles proximate to a tile containing a particular HDR pixel, wherein the number of the plurality of tiles proximate to said tile containing the particular HDR pixel depends on content of a scene that has been captured by said first image;
    performing a global tone mapping on each HDR pixel using a global transfer function for converting HDR pixels into LDR pixels having a globally tone mapped value, said global transfer function being derived from an average value of said at least one image parameter of all said HDR pixels;
    deriving a final value for each LDR pixel by weighting said locally and globally tone mapped pixel values using a first weighting factor applied to each said locally tone mapped LDR pixel value and a second weighting factor applied to each said globally tone mapped LDR pixel value and combining said weighted locally and globally tone mapped LDR pixel values; and
    storing one or more derived final values in a storage device.

2. The method as in claim 1, wherein said at least one image parameter includes a shadow percentile value and a highlight percentile value and said transfer functions comprise sigmoid tone mapping functions embodied in a look-up table of a computer processor.

3. The method as in claim 2, wherein said first image and second images are color images comprising pixels with red (R), green (G), blue (B), and infrared (IR) components, each said component being represented by 16 bits of data in said first HDR image and 8 bits of data in said second LDR image.

4. The method as in claim 3, wherein
    said plural tiles proximate to said tile define a neighborhood of said tiles and each said neighborhood has a shadow percentile value (ShadowValue) and a highlight percentile value (HighlightValue) for each component of said HDR image comprising said neighborhood, and the method further includes:
        determining neighborhood values of the following tonal balancing parameters for all of said neighborhoods in said image
        RGBTileShadowValue=min(ShadowValueR,ShadowValueG,ShadowValueB)
        FCIRTileShadowValue=min(ShadowValueR,ShadowValueG,ShadowValueIR)
        RGBTileHighlightValue=max(HighlightValueR,HighlightValueG, HighlightValueB)
        FCIRTileHighlightValue=max(HighlightValueR,HighlightValueG, HighlightValueIR),
    where the notation "min(A,B,C)" indicates that a tonal balancing parameter is taken as the minimum value of the included percentile values for each pixel in said respective tile, and the notation "max(A,B,C)" indicates that a tonal balancing parameter is taken as the maximum value of the included percentile values for each pixel in said respective tile;
        assigning to a predetermined tile in each said neighborhood said neighborhood values of said tonal balancing parameters; and
        deriving from said neighborhood tonal balancing parameters plural transfer functions for tone mapping each said component of each HDR pixel in said predetermined tile to an LDR pixel.

5. The method as in claim 4, wherein said tiles are square, said neighborhood comprises a square matrix of at least nine tiles, and said predetermined tile is the center tile of each said matrix.

6. The method as in claim 5, wherein,
    for a pixel in said first image located at a point X,Y in one of four equal quadrants of said center tile and having an HDR value for each image component of $S_{X,Y}$, with the neighbor transfer functions for the image components of said center tile being $f_{11}$, and the neighborhood transfer functions for the image components of each of said three tiles adjacent to said quadrant respectively being $f_{12}$, $f_{22}$, and $f_{21}$ viewed in a clockwise direction around said center tile, the locally tone mapped values for said components of said HDR pixel at X,Y are determined by the following algorithm $R1=(X2-X)/(X2-X1)\times f_{11}+(X-X1)/(X2-X1)\times f_{21}$ $R2=(X2-X)/(X2-X1)\times f_{12}+(X-X1)/(X2-X1)\times f_{22}$ $P_{X,Y}=(Y2-Y)/(Y2-Y1)\times R1+(Y-Y1)/(Y2-Y1)\times R2$, and wherein X,Y are the coordinates of said pixel in question and the center of said center tile is the origin of orthogonal X-Y axes, with X1,Y2, X2,Y2, and X2,Y1 are the respective coordinates of the centers of said three adjacent tiles viewed in a clockwise direction around said center tile.

7. The method as in claim 6, wherein each said transfer function for locally tone mapping said HDR pixel at X,Y to an LDR image pixel is derived by:
   subtracting said RGBTileShadowValue from each of said HDR pixel's R,G,B, components and FCIRTileShadowValue from said pixel's IR component;
   obtaining a floating point value between 0 and 1 by multiplying each respective pixel component value by a scale factor=1÷ the derived 16-bit dynamic range for said center tile, wherein each of said pixel's R, G, and B components have a dynamic range=RGBTileHighlightValue−RGBTileShadowValue and said pixel's IF component has a dynamic range=FCIRTileHighlightValue−FCIRTileShadowValue;
   applying a gamma value ($\gamma$) as a power-law function in the form $y=x^{1/\gamma}$, wherein x is said floating point value; and
   multiplying said gamma-corrected floating point value (y) by 255, wherein any resulting value below RGBTileShadowValue or FCIRTileShadowValue will be mapped to 0, and any resulting value above RGBTileHighlightValue or FCIRTileHIghlightValue will be mapped to 255.

8. The method as in claim 7, wherein said global transfer function for globally tone mapping a said HDR pixel in said first image to an LDR pixel is derived by:
   determining an average global shadow percentile value (ShadowValue) and an average global highlight percentile value (HighlightValue) for all of said neighborhoods in said region R;
   deriving global tonal balancing parameters RGBGlobShadowValue=min(ShadowValueR,ShadowValueG,ShadowValueB), FCIRGlobShadowValue=min(ShadowValueR,ShadowValueG,ShadowValueIR), and RGBGlobHighlightValue=max(HighlightValueR, HighlightValueG,HighlightValueB), based on said average global shadow and highlight percentile values, where the notation "min(A,B,C)" indicates that a tonal balancing parameter is taken as the minimum value of the included percentile values for each pixel in said respective tile, and the notation "max(A,B,C)" indicates that a tonal balancing parameter is taken as the maximum value of the included percentile values for each pixel in said respective tile;
   subtracting said RGBGlobShadowValue from each of said pixel's R,G,B, components and FCIRTileShadowValue from said pixel's IR component;
   obtaining a floating point value between 0 and 1 by multiplying each respective pixel component value by a scale factor=1÷ the derived 16-bit dynamic range for said pixel, wherein each of said pixel's R, G, and B components have a dynamic range=RGBGlobHighlightValue−RGBGlobShadowValue and said pixel's IF component has a dynamic range=FCIRGlobHighlightValue−FCIRGlobShadowValue;
   applying a gamma value ($\gamma$) as a power-law function in the form $y=x^{1/\gamma}$, wherein x is said floating point value; and
   multiplying said gamma-corrected floating point value (y) by 255, wherein any resulting value below RGBGlobShadowValue or FCIRGlobShadowValue will be mapped to 0, and any resulting value above RGBGlobHighlightValue or FCIRGlobHIghlightValue will be mapped to 255.

9. The method as in claim 8, wherein said first weighting factor is a local weight factor and said second weighting factor is (1−local weight factor), and said final LDR pixel value is determined for each image component.

10. The method as in claim 3, wherein said first weighting factor is a local weight factor and said second weighting factor is (1−local weight factor), and said final LDR pixel value is determined for each image component.

11. The method as in claim 1, wherein said first and second weighting factors have a sum-to-one relationship.

12. The method as in claim 1, wherein
   said at least one image parameter includes a shadow percentile value and a highlight percentile value and said transfer functions comprise sigmoid tone mapping functions embodied in a look-up table of a computer processor,
   said first image and second images are color images comprising pixels with red (R), green (G), blue (B), and infrared (IR) components, each said component being represented by 16 bits of data in said first HDR image and 8 bits of data in said second LDR image,
   said plural tiles proximate to said tile define a neighborhood of said tiles and each said neighborhood has a shadow percentile value and a highlight percentile value for each component of said HDR image comprising said neighborhood, and
   the method further includes:
      determining neighborhood values of the following tonal balancing parameters for all of said neighborhoods in said image by:
         setting a RGB shadow percentile tonal balancing parameter for each respective tile to the minimum value of the shadow percentile value of each of the R, G and B components;
         setting an IR shadow percentile tonal balancing parameter for each respective tile to the minimum value of the shadow percentile value of each of the R, G and IR component;
         setting a RGB highlight percentile tonal balancing parameter for each respective tile to the maximum value of the highlight percentile value of each of the R, G and B component; and
         setting an IR highlight percentile tonal balancing parameter for each respective tile to the maximum value of the highlight percentile value of each of the R, G and IR component;
      assigning to a predetermined tile in each said neighborhood said neighborhood values of said tonal balancing parameters; and
      deriving from said neighborhood tonal balancing parameters plural transfer functions for tone mapping each said component of each HDR pixel in said predetermined tile to an LDR pixel.

13. A computer system for converting a first image represented by HDR pixels having a predetermined dynamic range, said first image comprising a plurality of tiles each including a two-dimensional array of a plurality of said HDR pixels, into a second image with corresponding LDR pixels having a lower dynamic range, the system comprising:
   a processor module with executable instructions in an operating system module stored on a computer storage medium for carrying out operations that:
      perform a local tone mapping on each HDR pixel of said first image using a local transfer function for converting HDR pixels into LDR pixels having a locally tone mapped value, said local transfer function being derived from at least one image parameter of said HDR pixels in a plurality of tiles proximate to a tile containing a particular HDR pixel, wherein the number of the plurality of tiles near said tile containing the particular HDR pixel depends on content of a scene of said first image, each tile including a plurality of pixels, perform a global tone mapping on each HDR pixel using a global transfer function for converting HDR pixels into LDR pixels having a globally tone mapped value, said global transfer function being derived from an average value of said at least one image parameter of all said HDR pixels, and derive a final value for each LDR pixel by weighting said locally and globally tone mapped pixel values using a first weighting factor applied to each said locally tone mapped LDR pixel value and a second weighting factor applied to each said globally tone mapped LDR pixel value and combining said weighted locally and globally tone mapped LDR pixel values; and a storage module storing one or more derived final values in a storage device.

14. The system as in claim 13, further comprising a display component for rendering said second image in human-readable form.

15. The system as in claim 14, wherein said first image and second images are color images comprising pixels with red (R), green (G), blue (B), and infrared (IR) components, each said component being represented by 16 bits of data in said first HDR image and 8 bits of data in said second LDR image.

16. The system as in claim 15, wherein:
said tiles are square, said neighborhood comprises a square matrix of at least nine said tiles, and said predetermined tile is in the center of said neighborhood;
each said neighborhood has a shadow percentile value (ShadowValue) and a highlight percentile value (HighlightValue) for each component of said HDR image comprising said neighborhood,
neighborhood values of the following tonal balancing parameters are determined for all of said neighborhoods in said image
RGBTileShadowValue=min(ShadowValueR,ShadowValueG,ShadowValueB)
FCIRTileShadowValue=min(ShadowValueR,ShadowValueG,ShadowValueIR)
RGBTileHighlightValue=max(HighlightValueR,HighlightValueG, HighlightValueB)
FCIRTileHighlightValue=max(HighlightValueR,HighlightValueG, HighlightValueIR),
where the notation "min(A,B,C)" indicates that a tonal balancing parameter is taken as the minimum value of the included percentile values for each pixel in said respective tile, and the notation "max(A,B,C)" indicates that a tonal balancing parameter is taken as the maximum value of the included percentile values for each pixel in said respective tile;
said neighborhood values of said tonal balancing parameters is assigned to said center tile in said neighborhood; and
said plural transfer functions for tone mapping each said component of each HDR pixel in said center tile to an LDR pixel are derived from said neighborhood tonal balancing parameters.

17. The system as in claim 16, wherein,
for a pixel in said first image located at a point X,Y in one of four equal quadrants of said center tile and having an HDR value for each image component of $S_{X,Y}$, with the neighbor transfer functions for the image components of said center tile being $f_{11}$, and the neighborhood transfer functions for the image components of each of said three tiles adjacent to said quadrant respectively being $f_{12}$, $f_{22}$, and $f_{21}$ viewed in a clockwise direction around said center tile, the locally tone mapped values for said components of said HDR pixel at X,Y is determined by the following algorithm $$R1=(X2-X)/(X2-X1) \times f_{11} + (X-X1)/(X2-X1) \times f_{21}$$

$$R2=(X2-X)/(X2-X1) \times f_{12} + (X-X1)/(X2-X1) \times f_{22}$$

$$P_{X,Y}=(Y2-Y)/(Y2-Y1) \times R1 + (Y-Y1)/(Y2-Y1) \times R2, \text{ and}$$

wherein X,Y are the coordinates of said pixel in question and the center of said center tile is the origin of orthogonal X-Y axes, with X1,Y2, X2,Y2, and X2,Y1 are the respective coordinates of the centers of said three adjacent tiles viewed in a clockwise direction around said center tile.

18. The system as in claim 17, wherein each said transfer function for locally tone mapping said HDR pixel at X,Y to an LDR image pixel is derived by:
subtracting said RGBTileShadowValue from each of said HDR pixel's R,G,B, components and FCIRTileShadowValue from said pixel's IR component;
obtaining a floating point value between 0 and 1 by multiplying each respective pixel component value by a scale factor=1÷ the derived 16-bit dynamic range for said center tile, wherein each of said pixel's R, G, and B components have a dynamic range=RGBTileHighlightValue−RGBTileShadowValue and said pixel's IF component has a dynamic range=FCIRTileHighlightValue−FCIRTileShadowValue;
applying a gamma value (γ) as a power-law function in the form $y=x^{1/\gamma}$, wherein x is said floating point value; and
multiplying said gamma-corrected floating point value (y) by 255, wherein any resulting value below RGBTileShadowValue or FCIRTileShadowValue will be mapped to 0, and any resulting value above RGBTileHighlightValue or FCIRTileHIghlightValue will be mapped to 255.

19. The system as in claim 18, wherein said global transfer function for globally tone mapping a said HDR pixel in said first image to an LDR pixel is derived by:
determining an average global shadow percentile value (ShadowValue) and an average global highlight percentile value (HighlightValue) for all of said neighborhoods in said region R;
deriving global tonal balancing parameters RGBGlobShadowValue=min(ShadowValueR,ShadowValueG,ShadowValueB),
FCIRGlobShadowValue=min(ShadowValueR,ShadowValueG,ShadowValueIR),
RGBGlobHighlightValue=max(HighlightValueR,HighlightValueG,HighlightValueB), and
FCIRGlobHighlightValue=max(HighlightValueR,HighlightValueG,HighlightValueB), based on said average global shadow and highlight percentile values, where the notation "min(A,B,C)" indicates that a tonal balancing parameter is taken as the minimum value of the included percentile values for each pixel in said respective tile, and the notation "max(A,B,C)" indicates that a tonal balancing parameter is taken as the maximum value of the included percentile values for each pixel in said respective tile;
subtracting said RGBGlobShadowValue from each of said pixel's R,G,B, components and FCIRTileShadowValue from said pixel's IR component;

obtaining a floating point value between 0 and 1 by multiplying each respective pixel component value by a scale factor=1÷ the derived 16-bit dynamic range for said pixel, wherein each of said pixel's R, G, and B components have a dynamic range=RGBGlobHighlightValue−RGBGlobShadowValue and said pixel's IF component has a dynamic range=FCIRGlobHighlightValue−FCIRGlobShadowValue;

applying a gamma value (γ) as a power-law function in the form $y=x^{1/\gamma}$, wherein x is said floating point value; and multiplying said gamma-corrected floating point value (y) by 255, wherein any resulting value below RGBGlobShadowValue or FCIRGlobShadowValue will be mapped to 0, and any resulting value above RGBGlobHighlightValue or FCIRGlobHIghlightValue will be mapped to 255.

20. The system as in claim 15, wherein said first weighting factor is a local weight factor and said second weighting factor is (1−local weight factor), and said final LDR pixel value is determined for each image component.

21. The system as in claim 13, wherein said at least one image parameter includes a shadow percentile value and a highlight percentile value and said transfer functions comprise sigmoid tone mapping functions embodied in a look-up table of a computer processor.

22. The system as in claim 13, wherein said at least one image parameter includes a shadow percentile value and a highlight percentile value and said transfer functions comprise sigmoid tone mapping functions embodied in a look-up table of a computer processor, said first image and second images are color images comprising pixels with red (R), green (G), blue (B), and infrared (IR) components, each said component being represented by 16 bits of data in said first HDR image and 8 bits of data in said second LDR image, said tiles are square, said neighborhood comprises a square matrix of at least nine said tiles, and said predetermined tile is in the center of said neighborhood, each said neighborhood has a shadow percentile value and a highlight percentile value for each component of said HDR image comprising said neighborhood, neighborhood values of the following tonal balancing parameters are determined for all of said neighborhoods in said image by:

a RGB shadow percentile tonal balancing parameter for each respective tile to the minimum value of the shadow percentile value of each of the R, G and B components;

an IR shadow percentile tonal balancing parameter for each respective tile to the minimum value of the shadow percentile value of each of the R, G and IR component;

a RGB highlight percentile tonal balancing parameter for each respective tile to the maximum value of the highlight percentile value of each of the R, G and B component; and an IR highlight percentile tonal balancing parameter for each respective tile to the maximum value of the highlight percentile value of each of the R, G and IR component;

said neighborhood values of said tonal balancing parameters is assigned to said center tile in said neighborhood, and said plural transfer functions for tone mapping each said component of each HDR pixel in said center tile to an LDR pixel are derived from said neighborhood tonal balancing parameters.

23. A computer usable storage device with a computer program stored thereon, the computer program upon execution by a processor performs a method for converting a first image represented by HDR pixels having a predetermined dynamic range, said first image comprising a plurality of tiles each including a two-dimensional array of a plurality of said pixels, into a second image with corresponding LDR pixels having a lower dynamic range, said first image and second image being color images comprising pixels with red (R), green (G), blue (B), and infrared (IR) components, the method comprising:

performing a local tone mapping on each HDR pixel of said first image using a local transfer function for converting HDR pixels into LDR pixels having a locally tone mapped value, said local transfer function being derived from at least one image parameter of said HDR pixels in plural tiles proximate to a said tile containing a particular HDR pixel;

performing a global tone mapping on each HDR pixel using a global transfer function for converting HDR pixels into LDR pixels having a globally tone mapped value, said global transfer function being derived from an average value of said at least one image parameter of all said HDR pixels;

deriving a final value for each LDR pixel by weighting said locally and globally tone mapped pixel values using a first weighting factor applied to each said locally tone mapped LDR pixel value and a second weighting factor applied to each said globally tone mapped LDR pixel value and combining said weighted locally and globally tone mapped LDR pixel values;

determining neighborhood values of the following tonal balancing parameters for all of said neighborhoods in said image by:

setting a RGB shadow percentile tonal balancing parameter for each respective tile to the minimum value of the shadow percentile value of each of the R, G and B components;

setting an IR shadow percentile tonal balancing parameter for each respective tile to the minimum value of the shadow percentile value of each of the R, G and IR components;

setting a RGB highlight percentile tonal balancing parameter for each respective tile to the maximum value of the highlight percentile value of each of the R, G and B components; and setting an IR highlight percentile tonal balancing parameter for each respective tile to the maximum value of the highlight percentile value of each of the R, G and IR components;

assigning to a predetermined tile in each said neighborhood said neighborhood values of said tonal balancing parameters; and deriving from said neighborhood tonal balancing parameters plural transfer functions for tone mapping each said component of each HDR pixel in said predetermined tile to an LDR pixel; and storing said final LDR pixel values in a storage device for outputting said second image, wherein said at least one image parameter includes a shadow percentile value and a highlight percentile value and said transfer functions comprise sigmoid tone mapping functions embodied in a look-up table of a computer processor, each said component being represented by 16 bits of data in said first HDR image and 8 bits of data in said second LDR image, and wherein aid plural tiles proximate to said tile define a neighborhood of said tiles and each said neighborhood has a shadow percentile value and a highlight percentile value for each component of said HDR image comprising said neighborhood.

\* \* \* \* \*